(12) United States Patent
Zelepugas (10) Patent No.: US 9,041,545 B2
(45) Date of Patent: May 26, 2015

(54) AUDIO AWARENESS APPARATUS, SYSTEM, AND METHOD OF USING THE SAME

(76) Inventor: Eric Allen Zelepugas, McHenry, IL (US)

( * ) Notice: Subject to any disclaimer, the term of this patent is extended or adjusted under 35 U.S.C. 154(b) by 316 days.

(21) Appl. No.: 13/461,545

(22) Filed: May 1, 2012

(65) Prior Publication Data

US 2012/0280824 A1 Nov. 8, 2012

Related U.S. Application Data

(60) Provisional application No. 61/481,719, filed on May 2, 2011.

(51) Int. Cl.
| | | |
|---|---|---|
| *G08B 21/00* | (2006.01) | |
| *H04R 1/10* | (2006.01) | |
| *G01S 17/02* | (2006.01) | |
| *G01S 15/02* | (2006.01) | |
| *G01P 15/00* | (2006.01) | |
| *H04R 3/00* | (2006.01) | |
| *H04R 5/033* | (2006.01) | |
| *G01P 3/00* | (2006.01) | |
| *G01S 17/08* | (2006.01) | |
| *G01S 17/58* | (2006.01) | |
| *G01S 15/08* | (2006.01) | |
| *G01S 15/58* | (2006.01) | |

(52) U.S. Cl.
CPC .............. *H04R 1/1041* (2013.01); *G01P 15/00* (2013.01); *H04R 3/007* (2013.01); *H04R 5/0335* (2013.01); *G01P 3/00* (2013.01); *G01S 17/023* (2013.01); *G01S 17/08* (2013.01); *G01S 17/58* (2013.01); *G01S 15/025* (2013.01); *G01S 15/08* (2013.01); *G01S 15/58* (2013.01)

(58) Field of Classification Search
USPC ........ 340/500, 573, 670; 381/55, 56, 72, 104, 381/124
See application file for complete search history.

(56) References Cited

U.S. PATENT DOCUMENTS

| | | |
|---|---|---|
| 4,972,491 A | 11/1990 | Wilcox |
| 4,989,271 A | 2/1991 | Sapiejewski et al. |
| 5,467,775 A | 11/1995 | Callahan et al. |
| 5,675,658 A | 10/1997 | Brittain |
| 6,014,345 A | 1/2000 | Schmadeka |
| 6,453,042 B1 | 9/2002 | Roach et al. |
| 6,961,286 B1 | 11/2005 | Alagia |
| 7,349,547 B1 | 3/2008 | Isvan |
| 7,457,757 B1 | 11/2008 | McNeill et al. |
| 7,853,034 B1 | 12/2010 | Gresko |
| 2002/0085733 A1 | 7/2002 | Cottrell |
| 2003/0100274 A1 | 5/2003 | Brown |
| 2003/0119575 A1 | 6/2003 | Centuori |
| 2003/0197620 A1 | 10/2003 | Radousky |
| 2004/0037429 A1 | 2/2004 | Candioty |
| 2004/0179694 A1 | 9/2004 | Alley |

(Continued)

*Primary Examiner* — Jeffery Hofsass (57) ABSTRACT

The present invention relates to an apparatus that senses the intensity of sounds and the velocity of objects. Specifically, the present invention relates to an apparatus that may prevent an audio signal from reaching a user, make a warning noise, or otherwise alert the user when a object is noisy and/or approaching the user at a threatening rate. More specifically, the present invention takes data from the surrounding area and compares it to one or more thresholds to determine an object's threat level. The present invention relates to one or more speakers, and includes, generally, one or more microphones to receive and measure the intensity of surrounding noises and one or more range sensors to detect distance, velocity, and acceleration.

12 Claims, 6 Drawing Sheets

(56) References Cited

U.S. PATENT DOCUMENTS

| | | |
|---|---|---|
| 2005/0124415 A1 | 6/2005 | Centuori et al. |
| 2005/0226451 A1 | 10/2005 | Davis |
| 2005/0276421 A1 | 12/2005 | Bergeron et al. |
| 2005/0286717 A1 | 12/2005 | Viduya et al. |
| 2006/0034476 A1 | 2/2006 | Glezerman |
| 2006/0265091 A1 | 11/2006 | Mihura |
| 2007/0003061 A1 | 1/2007 | Jung et al. |
| 2007/0009122 A1 | 1/2007 | Hamacher |
| 2007/0121959 A1 | 5/2007 | Philipp |
| 2007/0154049 A1 | 7/2007 | Levitsky et al. |
| 2007/0160223 A1 | 7/2007 | Cusack |
| 2007/0177741 A1 | 8/2007 | Williamson |
| 2007/0235957 A1 | 10/2007 | Nenov et al. |
| 2007/0238490 A1 | 10/2007 | Myrberg et al. |
| 2008/0002838 A1 | 1/2008 | Pyle |
| 2008/0037801 A1 | 2/2008 | Alves et al. |
| 2008/0101643 A1 | 5/2008 | Shyu et al. |
| 2008/0130936 A1 | 6/2008 | Lau et al. |
| 2008/0175399 A1 | 7/2008 | Kim et al. |
| 2008/0220831 A1 | 9/2008 | Alameh et al. |
| 2008/0235026 A1 | 9/2008 | Garratt et al. |
| 2008/0299904 A1 | 12/2008 | Yi et al. |
| 2009/0010474 A1 | 1/2009 | Ouryouji |
| 2009/0082071 A1 | 3/2009 | Hicks |
| 2009/0123003 A1 | 5/2009 | Sibbald |
| 2009/0225043 A1 | 9/2009 | Rosener |
| 2009/0252355 A1 | 10/2009 | Mao |
| 2009/0262969 A1 | 10/2009 | Short et al. |
| 2009/0290742 A1 | 11/2009 | Rosener |
| 2009/0296948 A1 | 12/2009 | Hood |
| 2009/0316937 A1 | 12/2009 | Zheng et al. |
| 2010/0005953 A1 | 1/2010 | Kemmochi et al. |
| 2010/0014684 A1 | 1/2010 | Chen |
| 2010/0022283 A1 | 1/2010 | Terlizzi |
| 2010/0104125 A1 | 4/2010 | Neu et al. |
| 2010/0109895 A1 | 5/2010 | Rosener |
| 2010/0142718 A1 | 6/2010 | Chin et al. |
| 2010/0166204 A1 | 7/2010 | Yanagishita et al. |
| 2010/0191536 A1 | 7/2010 | Sampat et al. |
| 2010/0246807 A1 | 9/2010 | Kemmochi et al. |
| 2011/0002476 A1 | 1/2011 | Morishima et al. |

AUDIO AWARENESS APPARATUS, SYSTEM, AND METHOD OF USING THE SAME

This application claims priority to the U.S. provisional patent application filed under Ser. No. 61/481,719, which is incorporated by reference herein in its entirety.

TECHNICAL FIELD

The present invention relates to an apparatus that senses the intensity of sounds and the velocity of objects. Specifically, the present invention relates to an apparatus that may prevent an audio signal from reaching a user, make a warning noise, or otherwise alert the user when a object is noisy and/or approaching the user at a threatening rate. More specifically, the present invention takes data from the surrounding area and compares it to one or more thresholds to determine an object's threat level. The present invention relates to one or more speakers, and includes, generally, one or more microphones to receive and measure the intensity of surrounding noises and one or more range sensors to detect distance, velocity, and acceleration.

BACKGROUND

It is, of course, generally known that some devices produce audio waves for a user to hear, interpret, and understand. Audio waves may be a tone, a person's voice, or music. In order to send audio waves from one place to another they may be coded into electrical signals that can travel through wires.

Commonly, microphones are used to convert sound pressure from audio waves into voltages. Every sound is coded to a specific voltage magnitude and frequency. These electrical signals may be passed through electrically conductive wires made of copper, aluminum, or other conductive material known to one having ordinary skill in the art.

It is generally known to one skilled in the art that electrical signals may be alternating current (AC) signals or direct current (DC) signals. Generally, sound signals are AC signals having both a magnitude and a frequency. Loud sounds produce high voltage magnitudes and soft sounds produce low voltage magnitudes. Similarly, high-pitched sounds produce voltages with high frequencies and low-pitched sounds produce voltages with low frequencies. Therefore, no information is lost when converting an audible sound to a voltage signal.

Generally, transducers are used to convert electrical signals into audio waves. Speakers are a common form of a transducer. Based on the voltage magnitude and frequency, different sounds are produced. These sounds can then be processed by the human auditory system.

Frequently, speakers can produce volumes that are too excessive. Excessive volumes can cause repercussions directly by damaging ones auditory system. Excessive volumes can also cause repercussions indirectly by masking other sounds. This is generally known as noise pollution. Headphones and headsets were created to allow an individual control over his or her volume without disrupting the environment around them.

Regularly, individuals use headphones to listen to audio devices or use headsets to make telephone calls. Headphones and headsets involve, generally, one or more speakers being inserted into or placed onto one's ears. This allows for private enjoyment of music or conversations.

Often, when individuals use headphones or headsets, they plug or block their ears from hearing anything besides the audio from within the headphones or headsets. More often, people combine the use of speakers, headphones, and headsets with their daily routines. In doing so, one of an individual's five senses of perception is significantly hindered if not removed completely.

It is generally known that an individual has five senses for perception: hearing, sight, smell, taste, and touch. Each of these senses work together in order to allow an individual to perceive the events around them. By limiting or removing one sense, an individual's quality of perception becomes substantially lower.

Commonly, many warning signs are loud audible signals. Sirens, horns, bells, and whistles are all sounds that may be used to warn a person of a hazard. Other hazards are themselves warnings such as gunfire, explosions, and thunder. These warnings rely on an individual's hearing to get their message known.

Often, certain locations are noisier than others. More often noise changes by the hour. During the night, fewer things make noise and it is easier to distinguish sounds. During the day, people go about their lives, working, and making noise. This makes it harder to distinguish sounds. Also, a certain sound level that would be interpreted as a threat at night may be washed out by the noises and threats of the day.

Frequently, hazards produce little to no sound and rely on other senses for awareness. Fast moving objects such as vehicles are one of these hazards. For hazards without audible warnings, an individual must use another sense of perception: sight. The sight sense, however, is limited by an individual's range of vision. Without other warnings, an individual is unaware of objects or hazards outside one's range of vision.

Normally, an object that changes a distance in a short amount of time has a high velocity. Commonly, high velocity objects are associated with hazards or threats. An individual can detect changes in an object's velocity visually. Upon observation of this data, an individual can compare the object's velocity to what is considered a hazard or threat. If an object is seen as a hazard or threat, the individual may then take actions to avoid it.

Typically, infrared, ultrasonic, or another type of range sensor known to one skilled in the art may be used to make similar measurements. These sensors will produce data that can be interpreted much like an individual's sense of vision. In order to process the data, a microprocessor or another computing device known to one in the art is required.

Usually, a microprocessor or another computing device known to one in the art can perform calculations, much like the human brain. In most advanced electronic equipment, a computing device is required to process data and information. Microprocessors may perform most or all functions relative to processing data and information. Microprocessors have revolutionized technology allowing smaller devices to be manufactured.

Regularly, range sensors are used in a static position and can return accurate values based on observations. Often, range sensors may be used in moving objects. A sensor no longer observes accurate values when the sensor is in motion. For example, by rotating a range sensor fast enough, two different objects at two different distances can be observed as the same object changing its distance. In certain situations, an object can be observed to have a velocity larger than the speed of light, which is impossible. The sensor's own motion must be eliminated from the observation in order for an accurate value to be obtained. The movement of the sensor may be observed in addition to the object the sensor is observing.

Commonly, accelerometers are used to track an objects motion. An accelerometer is able to measure proper accelerations, or accelerations not produced by gravity. Examples of these are vibrations, shocks, rotations, or other changes of weight per unit mass. An accelerometer may be used to measure an objects movement. For example, movement of a cellular device may be measured by an accelerometer and may be used to wake the cellular device from its sleep mode.

Often, an individual may become distracted or preoccupied. This may also cause one's level of perception to lower. It is generally known that audio sounds such as music can distract an individual. When an individual uses headphones or a headset to listen to audio sounds they become distracted while additionally blocking all other sounds from entering their auditory system.

Generally, when an audio signal is interrupted unexpectedly, whether by removing that signal, replacing that signal with a warning signal, or otherwise interrupting that signal, an individual's sense of perception returns, if not heightens. An individual may notice this unexpected circumstance and question the reasoning behind the event. This may lead to an individual focusing on their sense of perception in order to determine the cause of the interruption. Once the cause of the interruption is determined or the threat that caused it has pass, the audio signal should return uninterrupted.

Commonly, real world signal processing of sounds or objects returns noisy signals. Noisy signals are defined as one signal that is made from multiple signals occurring simultaneously. An example of this is recording a sound sample from a busy intersection where multiple sounds from multiple locations are being recorded as one signal. Specific signals, such as a car horn, may become lost in the noise and require filtering to be recovered. A further example of this is detecting multiple objects with a range sensor. In order to focus on an individual object, the "noise" must be removed.

Generally, analog and digital signal processing may be used to distinguish or otherwise filter a single object from surrounding objects. Digital signal processing (DSP) includes subfields like audio, sonar, radar, ultrasonic, sensor array processing after these analog signals have been converted to digital. An example includes recognizing the audio signal of a car horn and removing it from all other signals. A further example includes separating multiple moving objects from each other in order to focus on an individual object.

A need, therefore, exists for an apparatus that allows one to listen to their audio device.

Further, a need exists for an apparatus that may be worn and may allow an individual to connect to an audio playing device such as a MP3 player, CD player, or other audio producing device.

Even further, a need exists for an apparatus that may be worn and may allow an individual to connect to an audio producing device such as speakers, headphones, or other audio producing device.

Also, a need exists for an apparatus that can otherwise perform the operation of perception when an individual's senses are blocked, limited, or otherwise hindered.

Therefore, a need exists for an apparatus that can interpret sound signals when an individual's sense of sound is blocked, limited, or otherwise hindered.

Specifically, a need exists for an apparatus that utilizes one or more microphones in order to obtain signals from the environment around an individual.

More specifically, a need exists for an apparatus that is capable of distinguishing the amplitudes of signals.

Further, a need exists for an apparatus with multiple sensitivity settings for use in day and night environments.

Moreover, a need exists for an apparatus that can interpret visual signals when an individual's sense of sight is blocked, limited, or otherwise hindered.

Specifically, a need exists for an apparatus that can detect motion of objects outside an individual's range of vision.

More specifically, a need exists for an apparatus that utilizes one or more range sensors in order to detect changes in the distance of objects.

Particularly, a need exists for an apparatus that is capable of digital signal processing in order to filter an individual signal from multiple real world signals.

More particularly, a need exists for an apparatus that can determine an object's velocity from those changes in distance.

In particular, a need exists for an apparatus that utilizes an accelerometer in order to distinguish its own movement from that of objects in the environment.

Further, a need exist for an apparatus that can perform logical calculations from real world signals.

Even further, a need exists for an apparatus that can compare calculated signals to pre-determined thresholds.

Specifically, a need exists for an apparatus that may obtain audio and range signals from one or more sensors, calculate the amplitude of these signals, calculate the distance of these signals, calculate the velocity of these signals, calculate the acceleration of these signals, compare calculated values to pre-determined thresholds, and warn a user when these thresholds are breached.

More specifically, a need exists for an apparatus that may warn a user by pausing or muting an audio signal, presenting a warning sound or message, or otherwise alert a user to unforeseen threats.

Even more specifically, a need exists for an apparatus that may return to normal functionality by un-pausing or un-muting an audio signal, terminating a warning sound or message, or otherwise conclude an alert when a threat has dissipated.

Finally, a need exists for an apparatus that may produce audio sound from electrical audio signals, permit audio sound during normal operation, detect audio levels in the environment, detect object motion in the environment, distinguish a threat from observed data, terminate audio sound upon detection of a threat, produce an audio warning, and restart audio sound after threat has been accessed.

SUMMARY OF THE INVENTION

The present invention relates to an apparatus that senses the intensity of sounds and the velocity of objects. Specifically, the present invention relates to an apparatus that may prevent an audio signal from reaching a user, make a warning noise, or otherwise alert the user when a object is noisy and/or approaching the user at a threatening rate. More specifically, the present invention takes data from the surrounding area and compares it to one or more thresholds to determine an object's threat level. The present invention relates to one or more speakers, and includes, generally, one or more microphones to receive and measure the intensity of surrounding noises and one or more range sensors to detect distance, velocity, and acceleration.

To this end, in an embodiment of the present invention, an audio awareness apparatus is provided. The audio awareness apparatus comprises of a main body portion with a first end and a second end, at least one audio sensor disposed at the first end, at least one range sensor disposed at the second end, at least one transducer capable of audio transmission, and at least one computing chip to perform calculations.

It is, therefore, an advantage of the present invention to provide an apparatus that allows one to listen to their audio device.

Further, it is an advantage of the present invention to provide an apparatus that may be worn and may allow an individual to connect to an audio playing device such as a MP3 player, CD player, or other audio producing device.

Even further, it is an advantage of the present invention to provide an apparatus that may be worn and may allow an individual to connect to an audio producing device such as speakers, headphones, or other audio producing device.

Also, it is an advantage of the present invention to provide an apparatus that can otherwise perform the operation of perception when an individual's senses are blocked, limited, or otherwise hindered.

Therefore, it is an advantage of the present invention to provide an apparatus that can interpret sound signals when an individual's sense of sound is blocked, limited, or otherwise hindered.

Specifically, it is an advantage of the present invention to provide an apparatus that utilizes one or more microphones in order to obtain signals from the environment around an individual.

More specifically, it is an advantage of the present invention to provide an apparatus that is capable of distinguishing the amplitudes of signals.

Further, it is an advantage of the present invention to provide an apparatus with multiple sensitivity settings for use in day and night environments.

Moreover, it is an advantage of the present invention to provide an apparatus that can interpret visual signals when an individual's sense of sight is blocked, limited, or otherwise hindered.

Specifically, it is an advantage of the present invention to provide an apparatus that can detect motion of objects outside an individual's range of vision.

More specifically, it is an advantage of the present invention to provide an apparatus that utilizes one or more range sensors in order to detect changes in the distance of objects.

Particularly, it is an advantage of the present invention to provide an apparatus that is capable of digital signal processing in order to filter an individual signal from multiple real world signals.

More particularly, it is an advantage of the present invention to provide an apparatus that can determine an object's velocity from those changes in distance.

In particular, it is an advantage of the present invention to provide an apparatus that utilizes an accelerometer in order to distinguish its own movement from that of objects in the environment.

Further, it is an advantage of the present invention to provide an apparatus that can perform logical calculations from real world signals.

Even further, it is an advantage of the present invention to provide an apparatus that can compare calculated signals to pre-determined thresholds.

Specifically, it is an advantage of the present invention to provide an apparatus that may obtain audio and range signals from one or more sensors, calculate the amplitude of these signals, calculate the distance of these signals, calculate the velocity of these signals, calculate the acceleration of these signals, compare calculated values to pre-determined thresholds, and prevent an audio signal from reaching a user when these thresholds are breached.

More specifically, it is an advantage of the present invention to provide an apparatus that may prevent an audio signal from reaching a user by pausing, muting, or otherwise terminating that signal.

Even more specifically, it is an advantage of the present invention to provide an apparatus that is capable of resetting an audio signal by un-pausing, un-muting, or otherwise permitting that signal.

Finally, it is an advantage of the present invention to provide an apparatus that may produce audio sound from electrical audio signals, permit audio sound during normal operation, detect audio levels in the environment, detect object motion in the environment, distinguish a threat from observed data, terminate audio sound upon detection of a threat, and restart audio sound after threat has been accessed.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present embodiments, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus that senses the intensity of sounds and the velocity of objects. Specifically, the present invention relates to an apparatus that may prevent an audio signal from reaching a user, make a warning noise, or otherwise alert the user when a object is noisy and/or approaching the user at a fast rate. More specifically, the present invention takes data from the surrounding area and compares it to one or more thresholds to determine an object's threat level. The present invention relates to one or more speakers, and includes, generally, one or more microphones to receive and measure the intensity of surrounding noises and one or more distance sensors to detect range, velocity, and acceleration.

Although the present invention is described in relation to allowing and interrupting audio sound from an audio producing device, it should be apparent to one of ordinary skill in the art that the components of the present invention, as described in the embodiments presented herein, may be useful for other purposes, such as in aiding the visually impaired.

Generally, an individual uses headphones, headsets, earbuds, speakers, or other audio producing devices to listen to audio signals from an audio device. An individual may plug a set of headphones, headsets, earbuds, speakers, or other audio producing device directly into an audio device via a 3.5 mm headphone jack. Any improvement to a set of headphones, headsets, earbuds, speakers, or other audio producing device must be either incorporated directly into the headphones, headsets, earbuds, speakers, or other audio producing device, between the headphones, headsets, earbuds, speakers, or other audio producing device and the audio device, or into the audio device.

Figure 1:
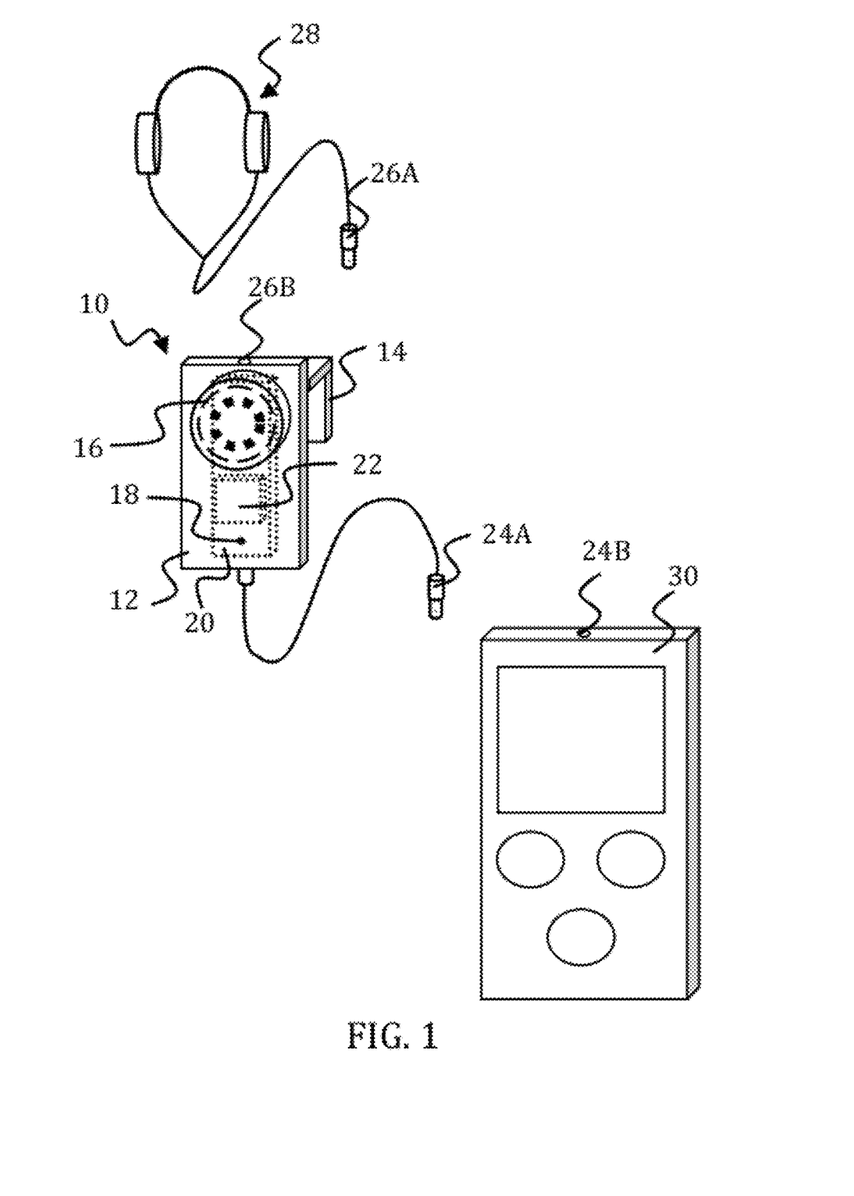
FIG. 1 illustrates a perspective view of an intermediate apparatus with a range sensor and a microphone in an embodiment of the present invention.

Now referring to the figures, wherein like numerals refer to like parts, an embodiment of the present invention is provided in FIG. 1. An apparatus 10 may comprise a casing 12, a belt clip 14, a range sensor 16, a microphone 18, a computing chip 20, an accelerometer 22, a headphone jack 26B, and a headphone input 24A. The casing 12 may contain circuitry connecting the range sensor 16, microphone 18, computing chip 20, accelerometer 22, an audio producing device 28, and an audio device 30. The audio producing device 28 may be a set of headphones, a set of earbuds, a headset, a set of speakers, or other audio producing device known to one skilled in the art. The belt clip 14 may be used to attach apparatus 10 to a user during use. The audio producing device 28 may comprise a headphone input 26A. The audio producing device 28 may able to be inserted into apparatus 10 by inserting headphone input 26A into headphone jack 26B. Audio device 30 may comprise a headphone jack 24B. Apparatus 10 may be inserted into audio device 30 by inserting headphone input 24A into headphone jack 24B.

During normal operation, apparatus 10 may allow an audio signal to travel from audio device 30, through apparatus 10, and into the audio producing device 28. Range sensor 16 may be able to detect the distance and/or velocity of objects around an individual. Microphone 18 may be able to detect the sound level of objects around an individual. Accelerometer 22 may be able to detect motion and/or velocity of apparatus 10. Computing chip 20 may utilize data from range sensor 16, microphone 18, and accelerometer 22 to determine an object's threat level. Computing chip 20 may have a plurality of pre-programmed thresholds that may determine an object's threat level. For example, a sound level of 100 decibels may be a sound threshold for a threat. Another example may be a velocity of 15 miles per hour. If an object's threat level is larger than a programmed threshold, apparatus 10 may emit a warning signal. The warning signal may be a sound, a message, an interruption such as pausing or muting the audio device 30, or other alert known to one skilled in the art. Apparatus 10 may comprise a battery (not shown) or draw power from the audio device 30.

Microphone 18 may be able to detect sounds in an environment around a user. Sounds are analog waves having both frequency and amplitude. Microphone 18 may convert analog audio sounds to a voltage with relative frequency and amplitude. As sound waves move through the microphone 18, vibrations may create voltage between metal plates found in the microphone 18. The volume level of a sound may be relative to the amplitude of the sound wave. Therefore, circuitry such as an envelope detector or another analog to digital conversion technique known to one skilled in the art may be used to obtain the amplitude of a signal, specifically. Once the amplitude of a signal is distinguished, the information may be sent to the computing chip 20.

Range sensor 16 may be able to detect an object's distance in an environment around a user. A pulse, beam, or alternative method known to one skilled in the art may be used to determine an object's distance away from a user. This information may be converted to a voltage level relative to an object's distance. Multiple measurements may be taken during a period of time. Taking multiple distance measurements over a period of time may make it possible to determine an objects velocity or acceleration. This information may be sent to the computing chip 20.

Accelerometer 22 may be able to detect a user's movement. Changes in distance, height, and rotation of apparatus 10 may change relative to a user. Accelerometer 22 may measure inclination, vibration, dynamic distance and speed with or without the influence of gravity. This information may be sent to computing chip 20.

Computing chip 20 may be able to combine data received from microphone 18, range sensor 16, accelerometer 22, and any and all related circuitry. Computing chip 20 may be able to perform calculations, digital signal processing, voltage comparison, and other various computing calculations known to one skilled in the art. Computing chip 20 may specifically be able to determine an object's velocity relative to the user from an object's change in distance. More specifically, computing chip 20 may be able to remove a user's velocity measured by accelerometer 22, therefore determining an object's velocity relative to the ground. Computing chip 20 may be programmed with sound level, velocity, and/or acceleration thresholds to compare to data from microphone 18, range sensor 16, and accelerometer 22. If any of the thresholds are breached, computing chip 20 may send a warning to a user. The warning may be an interruption of the audio signal from audio device 30 such as muting the signal or pausing the signal, a message such as a sound or a programmed voice, another method of alert known to one of ordinary skill in the art, or any combination thereof. The warning may be sent to audio producing device 28 to alert a user.

Figure 2:
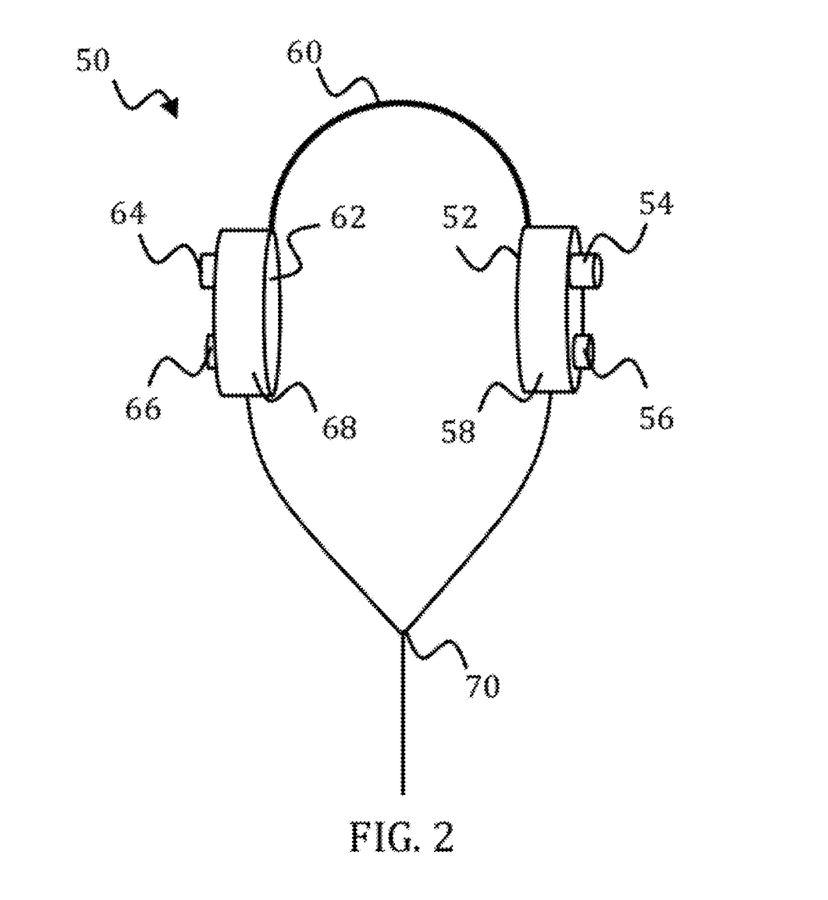
FIG. 2 illustrates perspective front view of a headphone apparatus with range sensors and microphones on either side in an alternate embodiment of the present invention.

Now referring to FIG. 2, a headphone apparatus is shown and described in an alternate embodiment of the present invention. Headphone apparatus 50 may comprise a headband 60, a left ear portion 58, a right ear portion 68, and an insulated wire 70. Left ear portion 58 may be connected to headband 60 at one end. Right ear portion 68 may be connected to headband 60 at an opposite end. Left ear portion 58 and right ear 68 may be cylindrical in shape, but may be of any shape known to one skilled in the art. Headband 60 may be arcuate and may span the length between left ear portion 58 and right ear portion 68. Left ear portion 58 may comprise a left-ear speaker 52, a left-side range sensor 54, and a left-side microphone 56. Left-ear speaker 52 may be able to convert voltage signals from insulated wire 70 to audible sound. Left-side range sensor 54 may be used to measure the distance of objects to the left of a user. Left-side microphone 56 may be used to detect noises to the left of a user.

Still referring to FIG. 2, right ear portion 68 may comprise a right-ear speaker 62, a right-side range sensor 64, and a right-side microphone 66. Right-ear speaker 62 may be able to convert voltage signals from insulated wire 70 to audible sound. Right-side range sensor 64 may be used to measure the distance of objects to the right of a user. Right-side microphone 66 may be used to detect noise to the right of a user.

Headphone apparatus 50 may be worn on a user's head, headband 60 may fit around the top of a user's head, and headphone apparatus 50 may plug directly into an audio device such as an MP3 or CD player. Left-ear speaker 52 and right-ear speaker 62 may be positioned on left ear and right ear respectively in order for proper audio transmission.

Headphone apparatus 50 may comprise a computing chip (not shown) to interpret data from left-side range sensor 54, left-side microphone 56, right-side range sensor 64, and right-side range sensor 66. Headphone apparatus 50 may also comprise an accelerometer (not shown). The accelerometer (not shown) may be able to detect the movement of a user's head and may send that information to the computing chip (not shown). The computing chip (not shown) may be programmed with sound level, velocity, and/or acceleration thresholds, as previously described in FIG. 1, to compare to data from left-side range sensor 54, left-side microphone 56, right-side range sensor 64, right-side range sensor 66, and accelerometer (not shown). If any of the thresholds are breached, the computing chip (not shown) may send a warning to a user. The warning sent from the computing chip (not shown) may be an interruption of the audio signal produced from left-ear speaker 52 and right-ear speaker 62, such as muting the audio signal or pausing the audio signal, a message like a sound or a programmed voice produced from left-ear speaker 52 and right-ear speaker 62, another alerting method known to one of ordinary skill in the art, or any combination thereof. After a time, or when a threat has moved on, the warning or alert may be removed and normal operation may continue.

Figure 3:
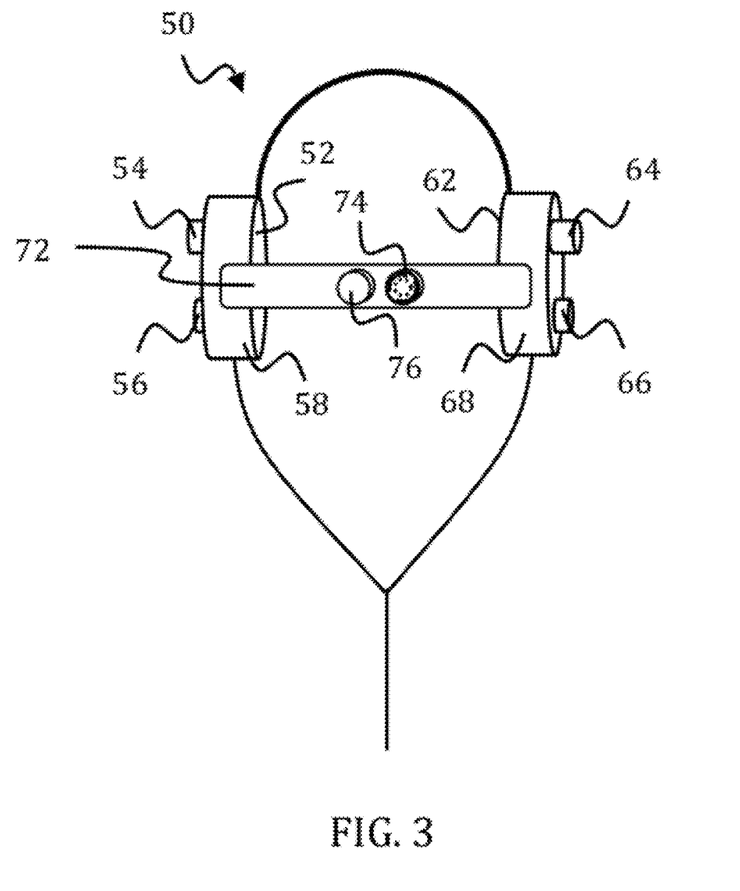
FIG. 3 illustrates a perspective back view of a headphone apparatus with an additional range sensor and microphone on the back in an alternate embodiment of the present invention.

As shown in FIG. 3, a headphone apparatus is shown and described in an alternate embodiment of the present invention. Headphone apparatus 50 may further comprise a back-band 72, a back range sensor 74, and a back microphone 76. Back-band 72 may be arcuate in shape and span the length between left ear portion 58 and right ear portion 68. Headphone apparatus 50 may be worn on a user's head and back-band 72 may fit around the back of a user's head. Back range sensor 74 may be disposed on the middle of back-band 72 and may be used to measure the distance of objects behind a user. Back microphone 76 may be disposed on the middle of back-band 72 and may be used to detect noise behind a user.

Incorporating a left-side range sensor 54 and a left-side microphone 56, a right-side range sensor 64 and a right-side range sensor 66, and a back range sensor 74 and a back microphone 76 may allow headphone apparatus 50 to detect all objects and sounds outside of a user's range of vision. A computing chip (not shown) may be programmed with sound level, velocity, and/or acceleration thresholds, as previously described in FIG. 1, to compare to data from left-side range sensor 54, left-side microphone 56, right-side range sensor 64, right-side range sensor 66, back range sensor 74, back microphone 76, and accelerometer (not shown). If any of the thresholds are breached, the computing chip (not shown) may send a warning to a user. The warning sent from the computing chip (not shown) may be an interruption of the audio signal produced from left-ear speaker 52 or right-ear speaker 62 such as muting the audio signal or pausing the audio signal, a message such as a sound or a programmed voice produced from left-ear speaker 52 and right-ear speaker 62, another method of alert known to one of ordinary skill in the art, or any combination thereof.

Figure 4:
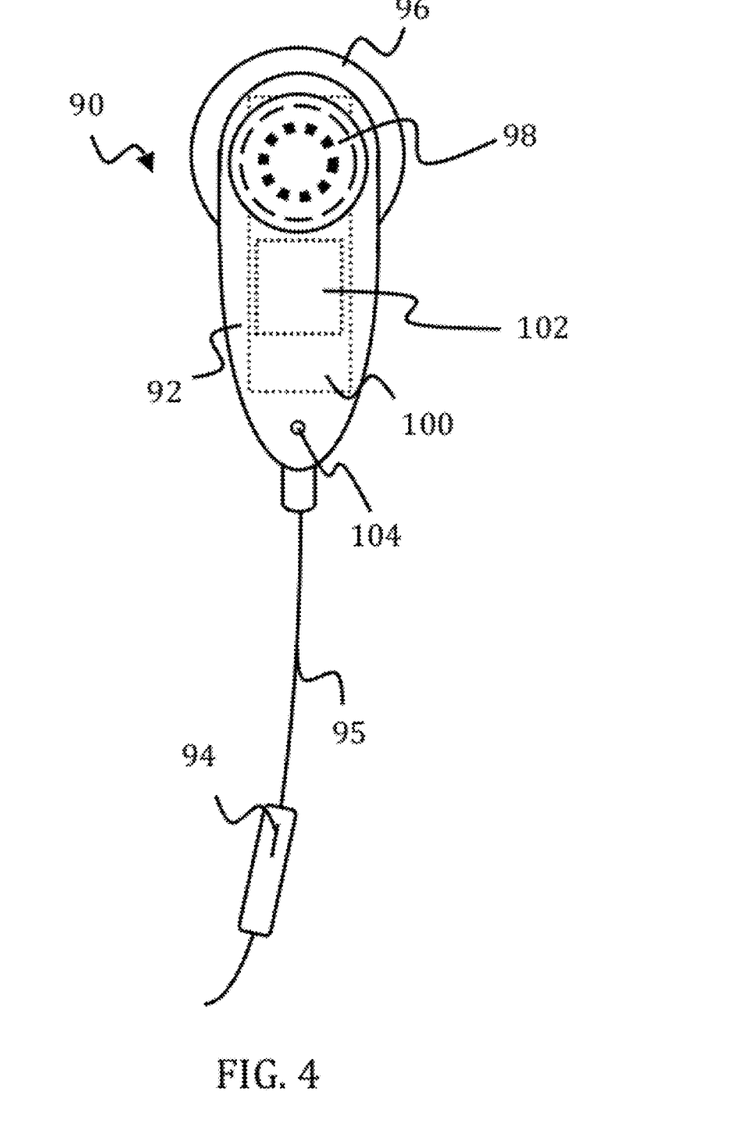
FIG. 4 illustrates a side view of an earbud apparatus with a range sensor and built in microphone in a preferred embodiment of the present invention.

Referring now to FIG. 4 in a preferred embodiment of the present invention, an earbud apparatus 90 is shown and described. Earbud apparatus 90 may be a set of headphones, a headset, or other audio producing device known to one skilled in the art. Earbud apparatus 90 may comprise an earpiece 92 and a built-in microphone 94. Earbud apparatus 90 may be used as a headset placed in one ear as shown in FIG. 4, however may connect to a second earpiece (not shown) and may be used as a set of headphones. Built-in microphone 94 may be disposed around an insulated wire 95 at a length away from earpiece 92. Insulated wire 95 may be able to transport voltage signals from one end to another. Built-in microphone 94 may be used as a conversational tool for communication, however while not in use in conversations, built-in microphone 94 may be used to detect sounds in an environment around a user.

Earpiece 92 may comprise an ear-insert 96, a range sensor 98, a computing chip 100, and an accelerometer 102. Ear-piece 92 may be small enough to fit inside a user's ear and large enough to enclose computing chip 100, accelerometer 102, and any and all circuitry related to those devices. Ear-insert 96 may be used to fit apparatus 90 inside of a user's ear so that audio transmission of an audio signal is private and clear. Accelerometer 102 may be disposed on top of computing chip 100 to save space inside earpiece 92. There may be a distance between accelerometer 102 and computing chip 100 so that computing chip 100 and accelerometer 102 may not overheat. Earpiece 92 may comprise one of more ventilation holes 104. Ventilation holes 104 may allow computing chip 100, accelerometer 102, or other alternative circuitry to cool down to prevent overheating. Range sensor 98 may extend outwardly away from earpiece 92 and may be able to detect objects in the vicinity of range sensor 98. Range sensor 98 may be disposed at one end of earpiece 92 so that a user's ear does not interfere with range sensor 98.

Computing chip 100 may be programmed with sound level, velocity, and/or acceleration thresholds, as described in relation the previous figures, to compare to data from range sensor 98, built-in microphone 94, and accelerometer 102. If any of the thresholds are breached, computing chip 100 may send a warning to a user. The warning sent from computing chip 100 may be an interruption of the audio signal produced by a speaker (not shown) disposed within ear-insert 96 such as muting the audio signal or pausing the audio signal, producing a message such as a sound or a programmed voice by the speaker (not shown), using another method of alert known to one of ordinary skill in the art, or any combination thereof.

Figure 5:
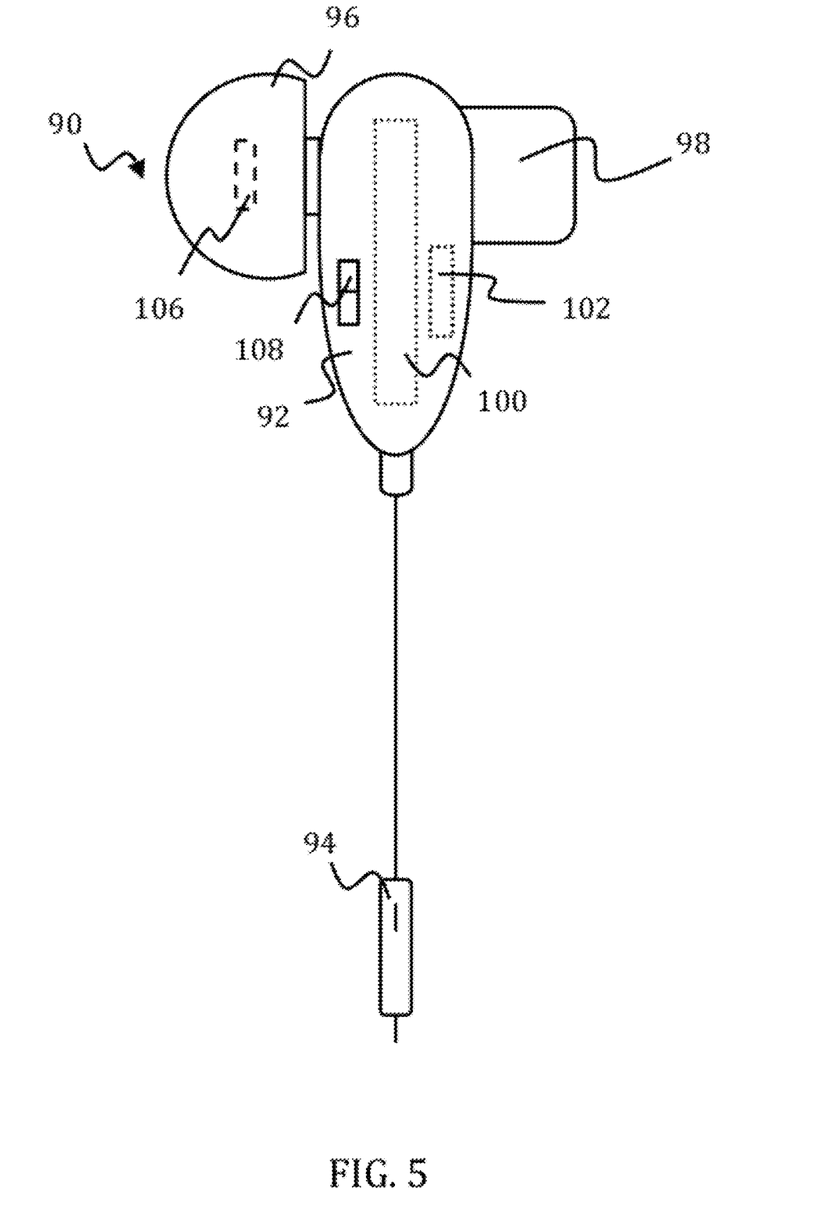
FIG. 5 illustrates a front view of an earbud apparatus with a range sensor and built in microphone in a preferred embodiment of the present invention.

As shown in FIG. 5, an alternate side view of the preferred embodiment of the present invention is shown and described. Ear-insert 96 may comprise a speaker 106 that may convert voltage signals into audible sound. Computing chip 100 may be centered within earpiece 92 so that circuitry (resisters, capacitors, wires, etc) connecting computing chip 100 to accelerometer 102, built-in microphone 94, range sensor 98, and speaker 106 may be minimized. Earbud apparatus 90 may further comprise a sensitivity switch 108. Sensitivity switch 108 may be able to change the programmed thresholds to a higher or lower setting depending on the environment around a user. A high threshold may be set for daytime usage with loud sounds and rapid objects occurring frequently. A low threshold may be set for nighttime usage where loud sounds and rapid objects occur less often, however may still be threatening.

Having accelerometer 102 and range sensor 98 incorporated on either ear as shown in FIGS. 4-5 may allow a warning to be sent to a single ear or to both ears. Sending a warning to a single ear may not only alert a user of a threat, but may also aid in locating the threat directionally. Sending an alert to the left ear may suggest a threat may be to the left of a user, sending an alert to the right ear may suggest a threat may be to the right of a user, and sending an alert to both ears may suggest a threat may be behind a user.

Figure 6:
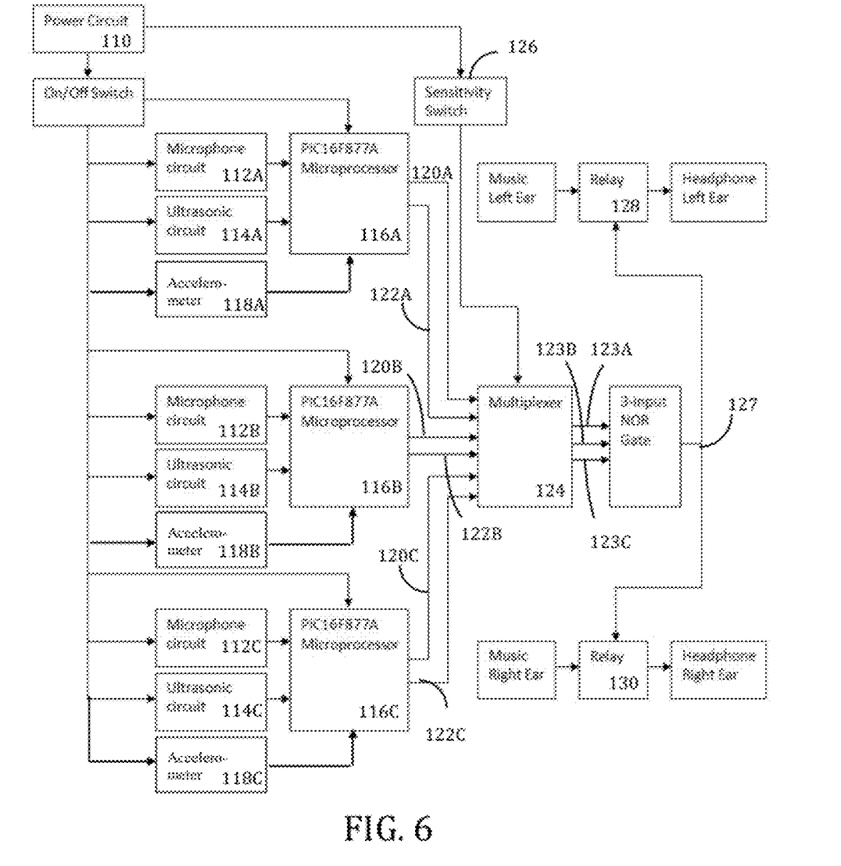
FIG. 6 illustrates a flow chart of an embodiment of the internal circuitry of the present invention.

Referring now to FIG. 6, in an embodiment of the present invention, a flow-chart of the internal circuitry is shown and described. A power circuit 110 may be used to provide power in the form of voltage and current to the electrical components of the present invention. The electrical components may include a plurality of microphone circuits 112A, 112B, 112C, a plurality of ultrasonic circuits 114A, 114B, 114C, a plurality of microprocessors 116A, 116B, 116C, and a plurality of accelerometers 118A, 118B, 118C. The microphone circuits 112A, 112B, 112C may be able to detect sound waves, convert the sound waves to an electrical voltage signal, amplify that signal, and produce the magnitude of the sound wave. The magnitude of the sound wave may be sent from microphone circuit 112A to microprocessor 116A, from microphone circuit 112B to microprocessor 116B, and from microphone circuit 112C to microprocessor 116C. The ultrasonic circuits 114A, 114B, 114C may be able to detect the distance of objects within range of the ultrasonic sensors (not shown). The ultrasonic circuits 114A, 114B, 114C may instead be another range sensor circuit known to one skilled in the art capable of detecting the distance of objects. A voltage signal relative to an objects distance may be sent from the ultrasonic circuits 114A, 114B, 114C to the microprocessors 116A, 116B, 116C respectively. Accelerometers 118A, 118B, 118C may be used to measure the movement of a user. A voltage signal relative to a user's movement may be sent from the accelerometers 118A, 118B, 118C to the microprocessors 116A, 116B, 116C.

Microprocessor 116A may process the voltage signals sent from the microphone circuit 112A, the ultrasonic circuit 114A, and the accelerometer 118A. Microprocessor 116A may be programmed with sensitivity thresholds for daytime and nighttime usage. Sound waves with high volumes may breach the programmed threshold and trigger a termination signal. Objects with high velocities, or large changes in distance in a short amount of time, may independently breach the programmed threshold and trigger the termination signal. The termination signal may be a logical '1' but may be any other signal known to one skilled in the art. The daytime threshold may be set so that louder common noises that occur during the day do not breach the threshold, while the nighttime threshold may be set so that lower suspicious noises that occur during the night may breach the threshold. A daytime termination signal 120A and a nighttime termination signal 122A may be sent to a multiplexer 124.

Microprocessor 116B may process the voltage signals sent from the microphone circuit 112B, the ultrasonic circuit 114B, and the accelerometer 118B. Microprocessor 116B may be programmed with sensitivity thresholds for daytime and nighttime usage. Sound waves with high volumes may breach the programmed threshold and trigger a termination signal. Objects with high velocities, or large changes in distance in a short amount of time, may independently breach the programmed threshold and trigger the termination signal. The termination signal may be a logical '1' but may be any other signal known to one skilled in the art. The daytime threshold may be set so that louder common noises that occur during the day do not breach the threshold, while the nighttime threshold may be set so that lower suspicious noises that occur during the night may breach the threshold. A daytime termination signal 120B and a nighttime termination signal 122B may be sent to a multiplexer 124.

Microprocessor 116C may process the voltage signals sent from the microphone circuit 112C, the ultrasonic circuit 114C, and the accelerometer 118C. Microprocessor 116C may be programmed with sensitivity thresholds for daytime and nighttime usage. Sound waves with high volumes may breach the programmed threshold and trigger a termination signal. Objects with high velocities, or large changes in distance in a short amount of time, may independently breach the programmed threshold and trigger the termination signal. The termination signal may be a logical '1' but may be any other signal known to one skilled in the art. The daytime threshold may be set so that louder common noises that occur during the day do not breach the threshold, while the nighttime threshold may be set so that lower suspicious noises that occur during the night may breach the threshold. A daytime termination signal 120C and a nighttime termination signal 122C may be sent to a multiplexer 124.

A sensitivity switch 126 may physically select between daytime termination signals 120A, 120B, 120C and nighttime termination signals 122A, 122B, 122C by used of a physical switch. The sensitivity switch 126 may also electronically select between daytime termination signals 120A, 120B, 120C and nighttime termination signal 122A, 122B, 122C by sending voltage signals to the selector bits of multiplexer 124. Sensitivity switch 126 may be a binary switch, selecting between a logical '1' and a logical '0' relative to daytime setting and nighttime setting, respectively. When sensitivity switch 126 is a logical '1', daytime termination signals 120A, 120B, 120C may be selected by the multiplexor 124 simultaneously. When sensitivity switch 126 is a logical '0', nighttime termination signals 122A, 122B, 122C may be selected simultaneously. Multiplexer 124 may output a plurality of decisive signals 123A, 123B, 123C, into a NOR gate 125. Decisive signals 123A, 123B, 123C may be a logical '1' if a threat was detected or a logical '0' if a threat was not detected. NOR gate 125 may output an end signal 127 that may be a logical '0' if any of the NOR gate 125 inputs are a logical '1.' Therefore, if a decisive signal 123A, 123B, or 123C is a logical '1' (a threat was detected) then end signal 127 may be a logical '0' (terminate audio signal). If a decisive signal 123A, 123B, or 123C is a logical '0' (a threat was not detected) then end signal 127 may be a logical '1' (allow audio signal). End signal 127 may be split and sent to a left-ear relay 128 and a right-ear relay 130. During normal operation (end signal 127 may be a logical '1'), left-ear relay 128 may allow an audio signal to go to the left ear and right-ear relay 130 may allow an audio signal to go to the right ear. When a threat has been established (end signal 127 is a logical '0'), left-ear relay 128 may prevent the audio signal from going to the left ear and right-ear relay 130 may prevent the audio signal from going to the right ear, effectively muting the audio signal.

Other logic may be utilized in order to mute, pause, or otherwise terminate an audio signal from reaching one or both ears. For example, an inverted decisive signal 123A may lead directly into left-ear relay 128. Therefore, if a threat is detected to the user's left (decisive signal 123A may be a logical '1' and therefore an inverted decisive signal 123A may be a logical '0') left-ear relay 128 may prevent an audio signal from going to the left ear. This may allow a user to directionally locate an established threat to the left of a user. An inverted decisive signal 123C may lead directly into right-ear relay 130. Therefore, if a threat is detected to the user's right (decisive signal 123C may be a logical '1' and therefore an inverted decisive signal 123C may be a logical '0') right-ear relay 130 may prevent an audio signal from going to the right ear. This may allow a user to directionally locate an established threat to the right of a user. An inverted decisive signal 123B may lead directly into both left-ear relay 128 and right-ear relay 130. Therefore, if a threat is detected behind the user (decisive signal 123B may be a logical '1' and therefore an inverted decisive signal 123B may be a logical '0') left-ear relay 128 and right-ear relay 130 may prevent an audio signal from going to the left ear and right ear respectively. This may allow a user to directionally locate an established threat behind of a user. Any of this logic, any combination thereof, or alternative logic known to one skilled in the art may be used interchangeably without departing from the sprit and scope of the present invention.

A particular description in a particular embodiment, while definitive, should not limit the present invention to that particular embodiment. It should be noted that various changes and modifications to the presently preferred embodiments described herein will be apparent to those skilled in the art.

Such changes and modifications may be made without departing from the spirit and scope of the present invention and without diminishing its attendant advantages.

I claim:

1. An apparatus for detecting environmental sound and object velocity comprising:
   a main body portion with a first end and a second end;
   an audio sensor disposed at the first end of the main body portion to detect noises in an environment;
   a range sensor disposed at the second end of the main body portion to detect distance, velocity, and acceleration of objects in an environment;
   a transducer capable of audio transmission disposed on the main body portion;
   a computing chip to perform calculations disposed on the main body portion; and
   a headphone input to connect to an audio producing device;
   wherein the computing chip is electronically connected to the audio sensor, the range sensor, the transducer, and the headphone input.

2. The apparatus of claim 1 further comprising an accelerometer electronically connected to the computing chip that measures the velocity and acceleration of a user.

3. The apparatus of claim 1 wherein the range sensor is an ultrasonic range sensor.

4. The apparatus of claim 1 wherein the range sensor is an infrared range sensor.

5. The apparatus of claim 1 wherein the transducer is a speaker.

6. The apparatus of claim 1 wherein the computing chip is a microprocessor capable of performing digital signal processing.

7. The apparatus of claim 1 wherein the audio sensor is a microphone.

8. A system for detecting environmental sound and object velocity comprising:
   a first apparatus comprising a first microphone, a first range sensor, and a first speaker, electronically connected to a first microprocessor;
   a second apparatus comprising a second microphone, a second range sensor, and a second speaker, electronically connected to a second microprocessor;
   wherein the first apparatus and the second apparatus are electronically connected together; and
   a headphone input to connect to audio producing devices, electronically connected to the first microprocessor and the second microprocessor.

9. The system of claim 8 further comprising an accelerometer, electronically connected to the first microprocessor and the second microprocessor.

10. The system of claim 8 wherein the first apparatus is positioned adjacent a first ear and the second apparatus is positioned adjacent a second ear.

11. The system of claim 8 wherein the first range sensor and first microphone gather data from a first direction and the second range sensor and second microphone gather data from a second direction.

12. The system of claim 8 further comprising an audio producing device connected via the headphone input.

* * * * *